(12) United States Patent
Baggs et al.

(10) Patent No.: US 8,605,951 B2
(45) Date of Patent: Dec. 10, 2013

(54) METHOD FOR CONVERTING A DIGITAL IMAGE INTO A MULTI-DIMENSIONAL GEO-REFERENCED DATA STRUCTURE

(75) Inventors: Julia E. Baggs, San Ramon, CA (US); John J. Bornhurst, San Ramon, CA (US); Michael J. McRae, Danville, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 353 days.

(21) Appl. No.: 12/847,157

(22) Filed: Jul. 30, 2010

(65) Prior Publication Data

US 2011/0181610 A1 Jul. 28, 2011

Related U.S. Application Data

(60) Provisional application No. 61/241,244, filed on Sep. 10, 2009.

(51) Int. Cl.
*G06K 9/00* (2006.01)

(52) U.S. Cl.
USPC ........................................................ 382/109

(58) Field of Classification Search
USPC ................. 382/109, 113, 154, 165, 285, 306; 356/241.1; 181/101; 367/7
See application file for complete search history.

(56) References Cited

U.S. PATENT DOCUMENTS

| | | | |
|---|---|---|---|
| 5,416,848 A | 5/1995 | Young | |
| 5,671,136 A | 9/1997 | Willhoit, Jr. | |
| 5,754,180 A | 5/1998 | Kivolowitz et al. | |
| 5,793,883 A * | 8/1998 | Kim et al. | 382/128 |
| 5,825,920 A | 10/1998 | Kitamura et al. | |
| 5,852,673 A | 12/1998 | Young | |
| 6,130,644 A * | 10/2000 | Massonnet | 342/453 |
| 6,363,327 B1 | 3/2002 | Wallet et al. | |
| 6,466,923 B1 | 10/2002 | Young | |
| 6,526,353 B2 | 2/2003 | Wallet et al. | |
| 6,950,751 B2 | 9/2005 | Knobloch | |
| 7,050,612 B2 | 5/2006 | Hale | |
| 7,139,423 B1 | 11/2006 | Nicolas et al. | |

(Continued)

FOREIGN PATENT DOCUMENTS

JP       200454621       2/2004

OTHER PUBLICATIONS

Lima et al ("Virtual Seismic Interpretation",University of North Carolina at Chapel Hill, Department of Computer Science, Oct. 1998).*

(Continued)

*Primary Examiner* — Shervin Nakhjavan
(74) *Attorney, Agent, or Firm* — Carlos Luis Hanze; Albert K. Shung

(57) ABSTRACT

The present invention is directed to a computer-implemented method for converting a digital image into a multi-dimensional geo-referenced data structure. The method includes pre-processing or preparing a digital image, defining a color map comprising values for the prepared digital image, defining geometry and location values for the prepared digital image, creating a data structure by assigning to each pixel in the digital image a value, based on the closest match in the color map, and an interpolated geometry and location value, based on the geometry and location values; and transmitting the data structure to an interpretation application and creating a multi-dimensional geo-referenced data structure for interpretation.

14 Claims, 3 Drawing Sheets

(56) References Cited

U.S. PATENT DOCUMENTS

| | | |
|---|---|---|
| 7,242,808 B2 | 7/2007 | Nikitin et al. |
| 8,326,537 B2 * | 12/2012 | Laake ................... 702/5 |
| 8,385,603 B2 * | 2/2013 | Beucher et al. ........... 382/109 |
| 8,391,562 B2 * | 3/2013 | Laake ................... 382/109 |
| 2007/0002138 A1 * | 1/2007 | Oldroyd .................. 348/143 |
| 2007/0112511 A1 * | 5/2007 | Burfeind et al. ........... 701/213 |
| 2007/0188516 A1 * | 8/2007 | Ioup et al. ................ 345/606 |
| 2007/0277115 A1 | 11/2007 | Glinsky et al. |
| 2008/0049553 A1 | 2/2008 | Chopra et al. |
| 2008/0162050 A1 * | 7/2008 | Harris et al. .............. 702/11 |
| 2008/0165186 A1 * | 7/2008 | Lin ...................... 345/419 |
| 2008/0270033 A1 | 10/2008 | Wiley et al. |
| 2009/0033674 A1 * | 2/2009 | Murrah et al. ............. 345/584 |
| 2010/0119102 A1 * | 5/2010 | Laake .................... 382/100 |

OTHER PUBLICATIONS

Computer Graphics and Geometric Modeling: Implementation and Algorithms. London: Springer, pp. 303-306 (2005).

Miles, Resurrecting Vintage Paper Seismic Records, Marine Geophysical Researches, Springer NL (2007).

* cited by examiner

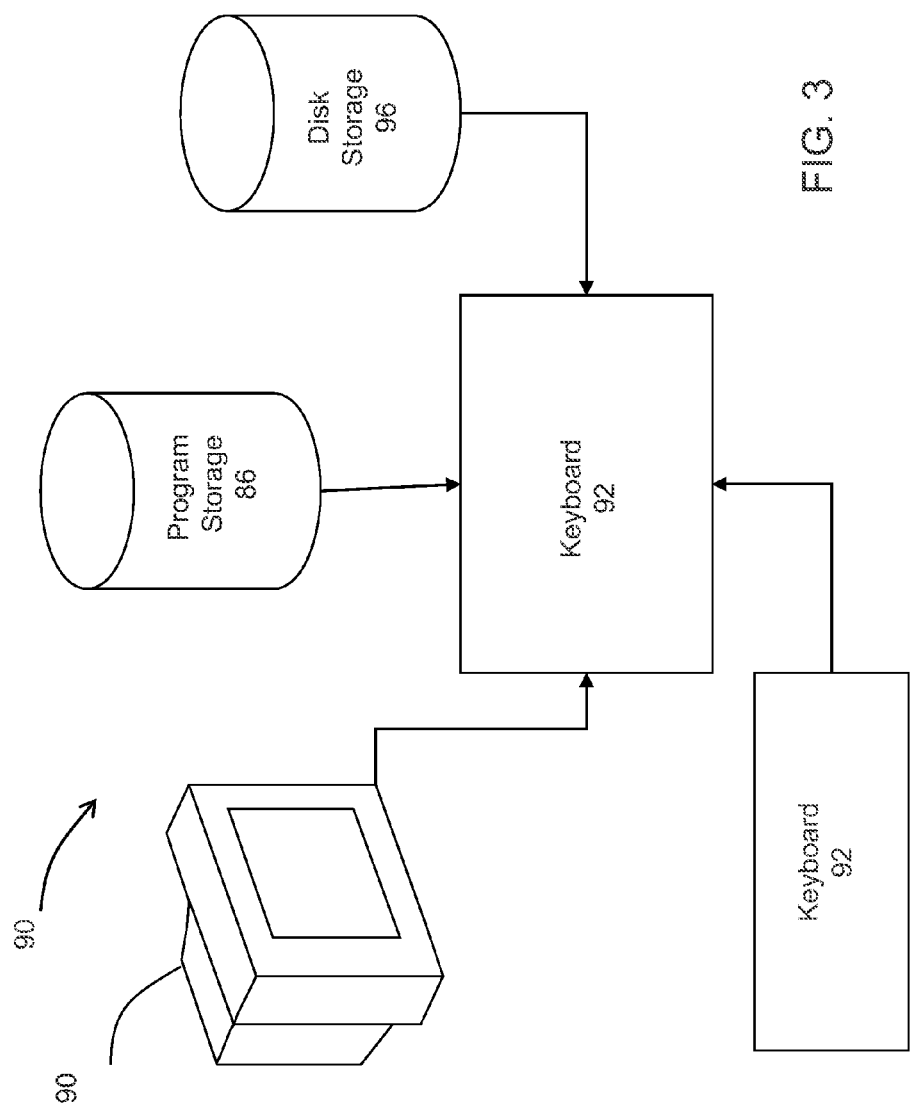

METHOD FOR CONVERTING A DIGITAL IMAGE INTO A MULTI-DIMENSIONAL GEO-REFERENCED DATA STRUCTURE

This Application is based upon and claims the benefit of U.S. Provisional Application 61/241,244 filed Sep. 10, 2009, the entire contents of which are incorporated herein by reference.

FIELD OF THE INVENTION

The present invention relates generally to methods and systems for converting a digital image into multi-dimensional geo-referenced data structures, and more particularly to methods which convert digital image data into multi-dimensional geo-referenced seismic data structures for geologic interpretation.

BACKGROUND OF THE INVENTION

Digital images exist in many file types (e.g., tiff, jpeg, gif, cgm, pdf), formats (e.g. raster, vector), and can be from any source and of any subject, including, but not limited to: seismic lines, photographs (aerial and other), geologic cross-sections, and well logs. Digital images are typically used out of context and apart from computer implemented interpretation applications that use information related to the digital images. For example, geoscientists may have digital images of seismic data but cannot view and interpret the images in context with other data in geologic interpretation applications. The ability to convert digital images to georeferenced multi-dimensional data structures that could be used within interpretation applications would increase the value of the digital image data.

Known methods of geo-referencing, converting and transmitting digital images to interpretation applications have generally been limited to two dimensional, black and white images, and been found to be unsatisfactory. Map-view digital images can be geo-referenced using GIS and remote sensing applications, but the resulting data format is not generally compatible with other computer applications. Moving digital images into interpretation applications involves scanning the image into a GIS application, manually digitizing each pixel as vectors, and exporting the vector data through another application. The process is labor-intensive and provides only vectorized shapes, lacking the detail of the original digital image. Other methods are limited to SEG-Y output formats, require expert computer application skills, and are: expensive, time consuming, not suitable for large-scale use, and tend to result in a loss of data quality.

Although some methods have been considered, there is a need for a method that geo-references a digital image, converts the digital image color information to a useful third dimension (for example, amplitude or depth/time) and transfers the digital image and information to an interpretation application where the image can be viewed and manipulated in context with other data.

SUMMARY OF THE INVENTION

Described herein are implementations of various technologies for converting a digital image into a multi-dimensional geo-referenced data structure, specifically to methods which convert digital image data into multidimensional geo-referenced seismic data structures for geologic interpretation.

According to one implementation of the present invention, a computer implemented method for converting a digital image into a multi-dimensional geo-referenced data structure is provided. The method includes storing a prepared digital image; defining a color map including values for the prepared digital image; defining geometry and location values for the prepared digital image; creating a data structure by assigning to each pixel in the digital image a value based on the closest match in the color map, and an interpolated geometry and location value based on the geometry and location values; and transmitting the data structure to an interpretation application and creating a multi-dimensional geo-referenced data structure for interpretation.

In another implementation of the present invention, a method for converting a digital image of seismic data into a 3-dimensional seismic data structure is provided.

According to another implementation of the present invention, a computer system configured to convert a digital image into a multi-dimensional geo-referenced image is provided. The system includes at least one computer storage device having computer readable media including a prepared digital image, and at least one processor, configured and arranged to execute computer-readable executable instructions stored in computer storage media for enabling a user to perform a method comprising: defining a color map having values for the prepared digital image; defining geometry and location values for the prepared digital image; creating a data structure by assigning to each pixel in the digital image a value, based on the closest match in the color map, and an interpolated geometry and location value, based on the geometry and location values; and transmitting the data structure to an interpretation application and creating a multi-dimensional geo-referenced data structure for interpretation. In an embodiment, the system further includes at least one graphical user interface including a user input device and at least one display device configured and arranged to display at least one image of a multi-dimensional geo-referenced image.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

These and other features of the present invention will become better understood with regard to the following description, pending claims and accompanying drawings where:

FIG. 3 schematically illustrates an example of a computer system for performing the present invention.

DETAILED DESCRIPTION OF THE INVENTION

Figure 1:
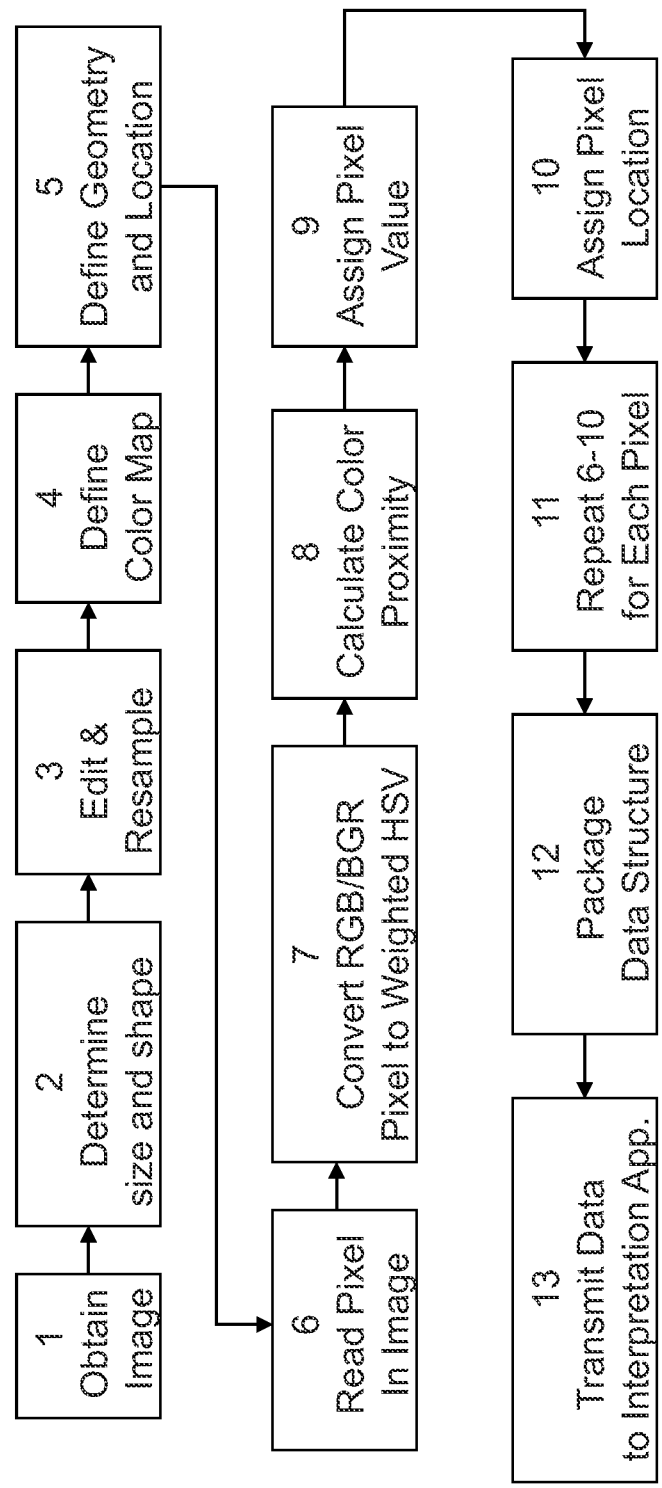
FIG. 1 illustrates a flowchart of one embodiment of the present invention.

FIG. 1 illustrates a flowchart of one embodiment of the present invention for a computer-implemented method 30 for converting a digital image into a multi-dimensional geo-referenced data structure. The method includes pre-processing or preparing a digital image, defining a color map having values for the prepared digital image, defining geometry and location values for the prepared digital image, creating a data structure by assigning the color value of each pixel in the digital image a useful value in the data structure, based on the closest match in the color map, and an interpolated geometry and location value, based on the geometry and location values; and transmitting the data structure to an interpretation application and creating a multi-dimensional geo-referenced image for interpretation.

An example of a method in accordance with an embodiment of the present invention is described below with reference to FIG. 1.

Preparing the Digital Image.

Step 1 includes obtaining a digital image to convert, from any source, and in any format. For example, a seismic line, seismic time slice, horizon, map, photograph, cross-section, CAD drawing, x-ray, well log, illustration, or screen capture image, each of which can be considered to be "geological" image data. Next, a size and shape for the digital image is determined (step 2), manually based on the characteristics of the image. The user makes a judgment based on the information visible in the image, or information that is already known about the image. Each pixel in the image will represent one element in the final data structure. If the data structure should be a matrix of 20×20 entries, then the image should contain 20×20 pixels. For example, a seismic line is made up of traces, evenly sampled at set times or depths down their length. An image of seismic data should therefore contain a number of pixels equal to the desired number of traces (across) and samples (down). Often the image will actually show shotpoint or trace notations across the top and time notations down one side. These values can be used to determine how many pixels the edited image should have. These values can be entered into a spreadsheet set up to calculate the correct number of pixels, or the calculation can be done by hand. For example, the determination of the number of pixels needed in other image types is left up to the user, based on the resolution of the image, the desired output, and their experience with similar images.

The digital image is then edited and resampled (step 3), to the desired number of pixels using an image-editing software application. A suitable application is, but is not limited to, Photoshop® by Adobe Systems Inc. The appropriate application should be chosen based on its capabilities and the experience of the user. The desired output from this step is a raster image of pre-determined size and shape, containing only the portion of the image intended to be converted, and saved in a standard file format. A suitable file format is, but is not limited to, TIFF (Tagged Image File Format) created using the LZW lossless compression algorithm. Editing steps may include, but are not limited to: cropping, compositing multiple images, color-correcting, re-sampling. For example, a screenshot of a seismic line may be cropped down to the seismic data area, re-sampled to the desired size, and saved as a TIFF formatted image.

Defining a Color Map Having Values for the Prepared Digital Image.

To define a color map (step 4) to enable each color in the image to be mapped to a numeric value, the color map is utilized as the guide the computer follows for each color. The user must determine what colors are present in the image and define them as RGB values. The colors present in the image can be determined using a number of methods. The user may already know the colors present based on the provenance of the image. They may determine the colors based on sampling tools available in image-editing software applications, such as the color picker in Adobe Photoshop®. Image-editing software applications also offer the ability to choose which colors will be present in an image. Software algorithms that read each pixel and print its attributes, including color, may also be used. Once the colors present in the image have been determined, the user inputs which color value is associated with each numeric value to be used in the desired output data structure. The user may input each value manually, or use another more automated means. One such method is to list the colors in their intended order in a text file and input the file to an algorithm that defines the color bar. If the input contains fewer color values than the maximum available for the data structure, the user may choose to interpolate them across all possible values, or simply use only the values submitted. For example, 8-bit seismic data contains a total of 256 individual values. An image of seismic data will often be in shades of 3 colors, 2 colors representing the extremes and one representing the middle. The user could supply these three colors and use an algorithm to blend them together, interpolating the values in between. Alternatively, it may be done with each value as an individual color, or any combination in between. For example, if the user intends to convert a photograph to a data structure that is limited to 64 values, the user may restrict the colors in the photograph to 64 and supply only those colors to the color bar. The output of the method is a data structure that includes values that may be represented by colors, based on a user-created color map. That is, the interpretation application in which the data structure will be used will apply its own method and color map to "decode" the values and display them as colors. To have the interpretation application display the original digital image colors, the user will generally have to manually enter them in the application, or submit them using the appropriate color map submission tool for the interpretation application. The interpretation application may be used to display the data structure using any color map the user chooses.

Define Geometry and Location.

To define the geometry and location (step 5) to geo-reference images to a location in space, the user inputs the coordinates where the data structure belongs, by either looking at the information pictured in the image, or through known information sources. The amount of geometry and location information required will depend on the data structure to be created. For example, in a 2D seismic line, the user may submit the X and Y coordinates and shotpoint values for at least two points on the line, generally the ends. They will also submit the top and bottom values to indicate how deep into the earth the line extends. Based on these values, the values of the other pixels in the image are interpolated. For example, in a 3D horizon or time or depth slice, the user may submit the X and Y coordinates of the corners of the image. Based on these values, the values of the other pixels in the image are interpolated. All descriptive information about the image file can be submitted to the interpretation application manually, or using batch methods. One such method is to create text files describing the images. The text files can be created using a script that reads the information from a database, spreadsheet, or other file that the user stores image information in.

Create a Data Structure.

Next, the method includes reading a pixel in the image (step 6), and accompanying data and determine the attributes of the first pixel. This step can include determining if the color attributes of the image are stored as RGB or BGR which is generally an input that the user supplies. Next, RGB/BGR pixels are converted to weighted HSV (step 7). This step may be implemented with any known algorithm to convert the RGB or BGR (red-green-blue or blue-green-red) values to HSV or HSL values (hue-saturation-value or hue-saturation-lightness). One example of such an algorithm is given in Agoston, *Computer Graphics and Geometric Modeling: Implementation and Algorithms*. London: Springer, pp. 303-306 (2005).

Next, the importance of the hue, saturation and value are weighted based on set defaults or on user input, this will determine the correct color in the next step. Using a partial three dimensional Euclidean distance formula to calculate proximity to cells in a user defined color map, proximity of pixel color to cells in a color map is calculated. Based on a closest match in the color map, value is assigned to a pixel (step 9). The number of colors and number of values is determined based on the type of data structure selected as the end product. For example: commonly for seismic and horizon data, the user color bar is 256 colors, so values of 0-255 are mapped to −128 to 127. In other words a color bar based on three colors like red, white and blue would map red to 1, white to 127 and blue to 255. In this example, 0 is the missing color bucket. If the closest index is 1 the amplitude becomes −127. For white an index of 127 maps to amplitude of 0. Location data is assigned to each pixel (step 10), using the geometry and location data submitted by the user, and correct location data is interpolated for the pixel. Steps 6-10 are repeated for each pixel in image (step 11), pixels may be processed simultaneously or serially. The resulting processed pixels are packaged into a data structure (step 12), by collecting each of the elements determined in steps 6-11 and package them according to the type of data being output. For example, in 2D seismic data, the package can be a seismic line with X/Y values, amplitudes, and Z values where the amplitude represents the color value determined at step 9. In another example, a 3D horizon package can be a horizon with X, Y, Z values where the Z represents the color value determined in step 9. Transmit Data to Interpretation Application.

To transmit the data structure to an interpretation application (step 13), the method 30 brings digital images into interpretation applications quickly while maintaining the quality and detail of the original digital images, effectively creating an environment from two dimensional data that can be viewed in three dimensions.

Figure 2:
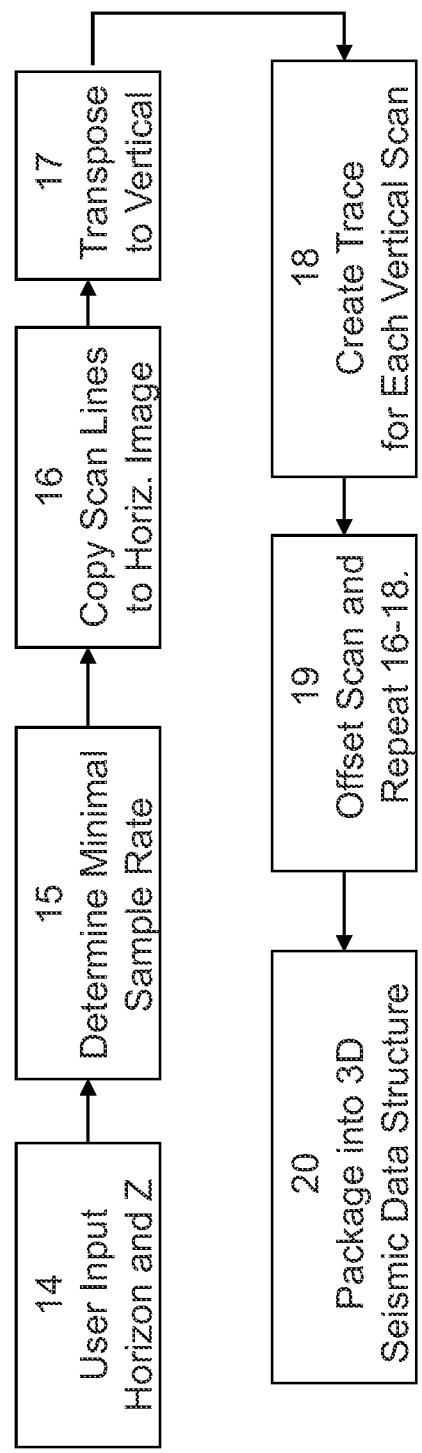
FIG. 2 illustrates a flowchart of another embodiment of the present invention.

FIG. 2 illustrates a flowchart of another embodiment of the present invention which converts data (referred to in the Fig. and herein as horizon data) to seismic data 40 to enable a data structure having X, Y, Z points to be converted into a 3D seismic cube having X, Y, Z and amplitude points for transmitting seismic slices to an interpretation application. A user inputs each horizon and desired 'Z' values (step 14), including the name or number of the horizon and the time or depth it should appear at in the final seismic cube. This is done for all horizons that should be included in the final cube. The user also inputs final cube name, format and mode (time or depth). This information is based on user preference and may include inferences based on prior knowledge of the data. A minimum sample rate is determined (step 15), by the computer. The computer reviews the user-submitted Z value for each of the horizons and calculates the distance (time or depth) between each one. The sample rate becomes the highest possible value common to all horizons (i.e., greatest common factor). For example, if user submits Z values that are 100 ms, 200 ms, and 300 ms, the sample rate of the cube will be 100 ms. This selection will ensure that there will be data at all points in the cube. If the user submits values that are 100 ms, 104 ms, 200 ms, 300 ms, the sample rate of the cube will be 4 ms. Because there is no data to display at the 4 ms intervals past 104 ms, those samples will be blank spaces. Depending on the use of the data, this may be more desirable than data that is stretched across larger gaps. As will be appreciated, where the sampling algorithm introduces numerous blank spaces, compression may be employed to reduce the storage requirements.

For each horizon, scan lines are copied to a horizontal image (step 16). Both three dimensional horizons and seismic lines can be raster images, for example. Image data is typically stored left to right, top to bottom (LtoRTtoB) for quick displays. Seismic data (if thought of as an image) may be stored TtoBLtoR or TtoBRtoL. When displaying seismic data on a computer the data is typically converted from TtoB (xxxx) to LtoRTtoB. The scan line is a row LtoR/RtoL or column TtoB/BtoT of data or subset of the image. The same concept is generally true for horizons. The horizontal image can be transposed to a vertical image (step 17), for example by using a matrix transpose in linear algebra. For each vertical scan, a new seismic trace is created (step 18). Steps 16-18 are repeated for offset scans until the entire image is processed (step 19). The elements determined in steps 16-18 are collected and packaged into a three dimensional seismic data structure (step 20), according to the type of data being output, by way of example, .bri or 0.3dv files, depending on the user input.

While in the foregoing embodiments and examples have been described in relation to utilizing the invention to bring digital images of seismic data into geologic interpretation applications, it will be apparent to those skilled in the art that the inventive concepts described herein apply to any field that works in multiple dimensions and has a need to integrate digital imagery into its business interpretation applications, for example, medical imaging, architecture, computer aided drafting, construction, government, city planning, law (models of crime scenes), and many others.

In an embodiment of the present invention, a digital image is converted to a different data structure that is compatible with the interpretation application the image is needed in.

FIG. 3 schematically illustrates an example of a computer network 84, in which embodiments of various technologies described herein may be implemented. The computer network 84 may include a data processing system or computer system 88, which may be implemented as any conventional personal computer or server. However, those skilled in the art will appreciate that implementations of various technologies described herein may be practiced in other computer system configurations, including hypertext transfer protocol (HTTP) servers, hand-held devices, multiprocessor systems, microprocessor-based or programmable consumer electronics, network PCs, minicomputers, Linux computers, mainframe computers, and the like.

The computer system 88, having at least one processor, is in electronic communication with disk storage or memory devices 86 and 96, which may be external hard disk storage devices. It is contemplated that disk storage devices 86 and 96 are conventional hard disk drives, and as such, will be implemented by way of a local area network or by remote access. Of course, a disk may be used to store any and all of the program instructions, measurement data, and results as desired.

In one implementation, digital image data representative of physical objects may be stored as computer storage media in disk storage device 96. The computer system 88 may retrieve the appropriate data from the disk storage device 96 to process the data according to program instructions that correspond to implementations of various technologies described herein. The program instructions may be written in a computer programming language, such as C++, Java and the like. The program instructions may be stored in a computer-readable medium, such as program disk storage device 86. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 88. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the computer system 88 may include graphical user interface (GUI) components such as a graphics display 90 and a keyboard 92 which can include a pointing device (e.g., a mouse, trackball, or the like, not shown) to enable interactive operation. The GUI components may be used both to display data and processed data products and to allow the user to select among options for implementing aspects of the method. The computer system 88 may store the results of the methods described above on disk storage 86, for later use and further analysis.

The computer system 88 may be located at a data center remote from the data acquisition region or processing facility (not shown). The computer system 88 may be in communication with the data acquisition receivers (either directly or via a recording unit, not shown), to receive signals indicative of the petrophysical properties of the subsurface rock structure. These signals, after conventional formatting and other initial processing may be stored by the computer system 88 as digital data in the disk storage 96 for subsequent retrieval and processing in the manner described above. While FIG. 3 illustrates the disk storage 96 as directly connected to the computer system 88, it is also contemplated that the disk storage device 96 may be accessible through a local area network or by remote access. Furthermore, while disk storage devices 86 and 96 are illustrated as separate devices for storing input data and analysis results, the disk storage devices 86 and 96 may be implemented within a single disk drive (either together with or separately), or in any other conventional manner as will be fully understood by one of skill in the art having reference to this specification.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention. All patents and publications referenced herein are hereby incorporated by reference to the extent not inconsistent herewith.

What is claimed is:

1. A computer implemented method for converting a digital image into a multi-dimensional geo-referenced data structure, the method comprising:
storing a prepared digital image on a computer readable medium in a computer readable format;
defining a color map comprising values for the prepared digital image;
defining geometry and location values for the prepared digital image; and
creating a multi-dimensional geo-referenced data structure for interpretation, wherein the multi-dimensional geo-reference data structure comprises horizon data and the horizon data is further converted to a seismic application to create a 3-dimensional seismic data structure, by using a computer to assign to each pixel in the digital image a value, based on a closet match in the color map, and a computer-interpolated geometry and location value, based on the geometry and location values.

2. The method of claim 1, wherein the horizon data comprises data sampled at a plurality of rates and a sample rate for the horizon data is determined in accordance with a greatest common factor of the plurality of sample rates.

3. The method of claim 1, wherein the converting the horizon data further comprises:
scanning lines of the horizon data to produce a horizontal image;
transposing the horizontal image to produce a vertical image;
creating a seismic trace for each of a plurality of vertical scans of the vertical image; and
combine the seismic traces to produce the 3-dimensional seismic data structure.

4. The method of claim 1, wherein the defining the color map further comprises defining a plurality of user-defined colors and automatically interpolating values between the user-defined colors within a selected color space.

5. The method of claim 1, wherein the assigning a geometry and location value further comprises accepting a user input for a plurality of values of geometry and location and automatically interpolating remaining values.

6. The method of claim 1, wherein the prepared digital image comprises image data pertaining to geological data.

7. The method of claim 1, further comprising the step of transmitting the data structure to an interpretation application.

8. A computer system configured to convert a digital image into a multi-dimensional georeferenced data structure, the system comprising:
at least one computer storage device having a computer readable medium; and
at least one processor, configured and arranged to execute computer-readable executable instructions stored in the computer readable medium to perform a method comprising:
defining a color map comprising values for the prepared digital image;
defining geometry and location values for the prepared digital image; and
creating a multi-dimensional geo-referenced data structure for interpretation. wherein the multi-dimensional geo-referenced data structured comprises horizon data and the horizon data is further converted to a seismic application to create a 3-dimensional seismic data structure, by using the computer to assign to each pixel in the digital image a value, based on a closest match in the color map, and a computer-interpolated geometry and location value, based on the geometry and location values.

9. The system of claim 8, further comprising a graphical user interface comprising a user input device and at least one display device, configured and arranged to display at least one image of a multi-dimensional geo-referenced data structure.

10. The system of claim 9, wherein the graphical user interface is constructed and arranged to allow a user to input instructions and the color map is defined based at least in part on user input via the graphical user interface to define a plurality of user-defined colors and wherein remaining colors are determined automatically by the processor by interpolation between the user-defined colors.

11. The system of claim 9, wherein the graphical user interface is constructed and arranged to allow a user to input instructions and the geometry and location values are based at least in part on user input via the graphical user interface to define a plurality of user-defined values of geometry and location and wherein remaining values are determined by the processor by interpolation between the user-defined values.

12. The system of claim 8, wherein the horizon data comprises data sampled at a plurality of rates and the computer-readable executable instructions stored in the computer readable medium further comprise instructions to determine a sample rate for the horizon data in accordance with a greatest common factor of the plurality of sample rates.

13. The system of claim 8, wherein the computer-readable executable instructions stored in the computer readable medium further comprise instructions for:
scanning lines of the horizon data to produce a horizontal image;
transposing the horizontal image to produce a vertical image;
creating a seismic trace for each of a plurality of vertical scans of the vertical image; and
combining the seismic traces to produce the 3-dimensional seismic data structure.

14. The system of claim 8, further comprising computer-rereadable executable instructions for transmitting the data structure to an interpretation application.

* * * * *